(12) United States Patent
Kim

(10) Patent No.: US 7,266,374 B2
(45) Date of Patent: Sep. 4, 2007

(54) COMMUNICATION SYSTEM AND METHOD IN WIRELESS INFRASTRUCTURE NETWORK ENVIRONMENTS

(75) Inventor: Han-sung Kim, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 339 days.

(21) Appl. No.: 10/833,059

(22) Filed: Apr. 28, 2004

(65) Prior Publication Data
US 2005/0020262 A1      Jan. 27, 2005

(30) Foreign Application Priority Data
Jul. 22, 2003    (KR) .................. 10-2003-0050245

(51) Int. Cl.
*H04Q 7/20*    (2006.01)
*H04Q 7/00*    (2006.01)

(52) U.S. Cl. ................ 455/439; 455/436; 455/453; 455/422.1; 455/442; 455/452.2; 370/331; 370/328; 370/338; 370/332

(58) Field of Classification Search ............. 455/439, 455/453, 422.1, 436, 437, 442, 443, 444, 455/452.2; 370/331, 328, 332, 338
See application file for complete search history.

(56) References Cited

U.S. PATENT DOCUMENTS 5,444,766 A * 8/1995 Farwell et al. .............. 455/437
6,201,969 B1 * 3/2001 Meier ........................ 455/442
6,947,768 B2 * 9/2005 Adachi et al. .............. 455/560
2003/0035464 A1   2/2003 Dehner et al.
2004/0229621 A1 * 11/2004 Misra ........................ 455/445
2005/0013276 A1 * 1/2005 Ekl et al. .................... 370/332

FOREIGN PATENT DOCUMENTS

| JP | 2002-26931 | 1/2002 |
| KR | 1998-16760 | 6/1998 |
| KR | 2001-49004 | 6/2001 |

* cited by examiner

*Primary Examiner*—George Eng
*Assistant Examiner*—Huy Phan
(74) *Attorney, Agent, or Firm*—Staas & Halsey LLP

(57) ABSTRACT

A wireless communication system including first and second wireless devices, and first and second access points to synchronize the first and second wireless devices, wherein the first access point determines whether the second access point exists in a neighboring area, periodically checks communication states of the second access point, sends an access point replacement command to the second wireless device linked to the second access point in response to determining the second access point is communication-disabled, and forms a new communication channel with the second wireless device according to an association request signal received from the second wireless device in response to the access point replacement command.

27 Claims, 5 Drawing Sheets

COMMUNICATION SYSTEM AND METHOD IN WIRELESS INFRASTRUCTURE NETWORK ENVIRONMENTS

CROSS-REFERENCE TO RELATED APPLICATIONS

This application claims the benefit of Korean Patent Application No. 2003-50245, dated Jul. 22, 2003, in the Korean Intellectual Property Office, the disclosure of which is incorporated herein by reference.

BACKGROUND OF THE INVENTION

1. Field of the Invention

The present invention relates to a wireless communication system and a method thereof, and, more particularly, to a wireless communication system and a method thereof in wireless infrastructure networking environments.

2. Description of the Related Art

Recently, wireless networking environments, together with wireless communication technology developments, have become widespread in everyday life. For example, as an alternative technology for a conventional wired LAN, Wireless Local Area Network (WLAN) technologies such as IEEE 802.11 are being used more and more. The IEEE stands for the Institute of Electrical and Electronics Engineers.

The IEEE 802.11 wireless LAN features the use of a wireless Radio Frequency (RF) technology using the 2.4 GHz band called the "Industrial Scientific Medical(ISM) band," instead of the use of cable, thereby enabling the networking capability to be equal to that of the wired LAN. There are two transmission modes of infrastructure networking and Ad-hoc networking for the IEEE 802.11 wireless LAN. Here, the Ad-hoc mode, in which a network is constructed with only devices mounting a wireless LAN therein, is not connected to external networks. That is, communications are performed among the wireless LAN devices in the Ad-hoc mode, so that the Ad-hoc mode is used for small-sized offices or small-scaled networks.

The infrastructure mode can be used in offices with environments that are equal to that of the existing wired LAN, and wireless networks for the infrastructure mode are constructed with access points, which are wired/wireless interfacing devices, connected to wired networks (Ethernets). An access point serves as a bridge between a wireless LAN device and a wired LAN device, enabling mutual data transmissions and receptions.

A wireless device has to exist in a wireless communication range of an access point to communicate with wired devices through the access point, and has the same ID as a basic service set identifier (BSSID) and a service set identifier (SSID) assigned to the access point. To do so, the wireless device receives a beacon frame that an access point periodically sends when a wireless LAN channel is changed. The wireless device, having received the beacon frame, sends a response message for an association request to the access point sending the beacon frame.

The access point, having received the association request from the wireless device, sends an association response message to the corresponding wireless device, including a BSSID and an SSID assigned to the access point. The wireless device receives and registers the association response message for its own network information, so that a communication channel is linked between the access point and the wireless device.

If a communication channel is linked between an access point and a wireless device, the wireless device can form one network with wired devices through the access point, and share the network resources. However, if the access point does not perform normal operations due to system defects such as a system failure, wireless devices connected to the access point cannot participate in the network any more. In this case, the wireless devices connected to the access point temporarily stop their data transmission/reception operations, and wait for an arbitrarily set period of time. Thereafter, the wireless devices attempt to associate with the access point, but cannot connect to the corresponding network until the access point performs its normal operations. Accordingly, there exists a problem in that the communication efficiency between the wireless devices and the access point is reduced.

SUMMARY OF THE INVENTION

The present invention has been devised to solve the above and/or other problems, so it is an aspect of the present invention to provide a wireless communication system, and a method thereof, capable of, in a case in which a wireless device cannot connect to an associated access point in a wireless infrastructure networking environment, transferring the wireless devices associated with the failed access point to a different access point.

Additional aspects and/or advantages of the invention will be set forth in part in the description which follows and, in part, will be obvious from the description, or may be learned by practice of the invention.

In order to achieve the above aspect, a wireless communication system, according to an embodiment of the present invention, comprises first and second wireless devices; and first and second access points to synchronize the first and second wireless devices, wherein the first access point determines whether the second access point exists in a neighboring area, periodically checks communication states of the second access point, sends an access point replacement command to the second wireless device linked to the second access point in response to determining the second access point is communication-disabled, and forms a new communication channel with the second wireless device according to an association request signal received from the second wireless device in response to the access point replacement command.

The access point may include a wireless transmission/reception unit to communicate with the first wireless device and the second wireless device; a storage unit to store information regarding the second access point; and a control unit to determine whether the second access point exists in the neighboring area, store in the storage unit the information regarding the second access point, periodically check the communication states of the second access point with reference to the stored information, send the access point replacement command through the wireless transmission/reception unit, and form the communication channel with the second wireless device.

The information on the second access point may include media access control (MAC) address information and network address information.

The control unit may determine whether a beacon frame is received through the wireless transmission/reception unit, and then determine whether the second access point exists in the neighboring area.

The wireless communication system may further comprise a signal level detection unit to detect a level of a signal received through the wireless transmission/reception unit, wherein the control unit determines the second access point exists in the neighboring area in response to the signal level of the beacon frame being more than a predetermined value.

A communication method for a wireless communication system having first and second wireless devices and first and second access points to synchronize the first and second wireless devices, according to an embodiment of the present invention, may comprise determining whether the second access point exists in a neighboring area of the first access point, and storing information on the second access point; periodically checking communication states of the second access point, and sending an access point replacement command to the second wireless device linked to the second access point in response to determining the second access point to be in a communication-disabled state; and forming a communication channel with the second wireless device according to an association request signal received from the second wireless device in response to the access point replacement command.

The information on the second access point may include MAC address information and network address information.

The determining whether a second access point exists in the neighboring area of the first access point may comprise determining whether a beacon frame is received through a wireless communication channel.

The forming the new communication channel with the second wireless device may include broadcasting the association request signal to the second access point; determining the communication states of the second access point according to whether an association response signal is received from the second access point; and sending the access point replacement command to the second wireless device in response to the second access point being determined to be in the communication-disenabled state.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE PREFERRED EMBODIMENTS

Figure 1:
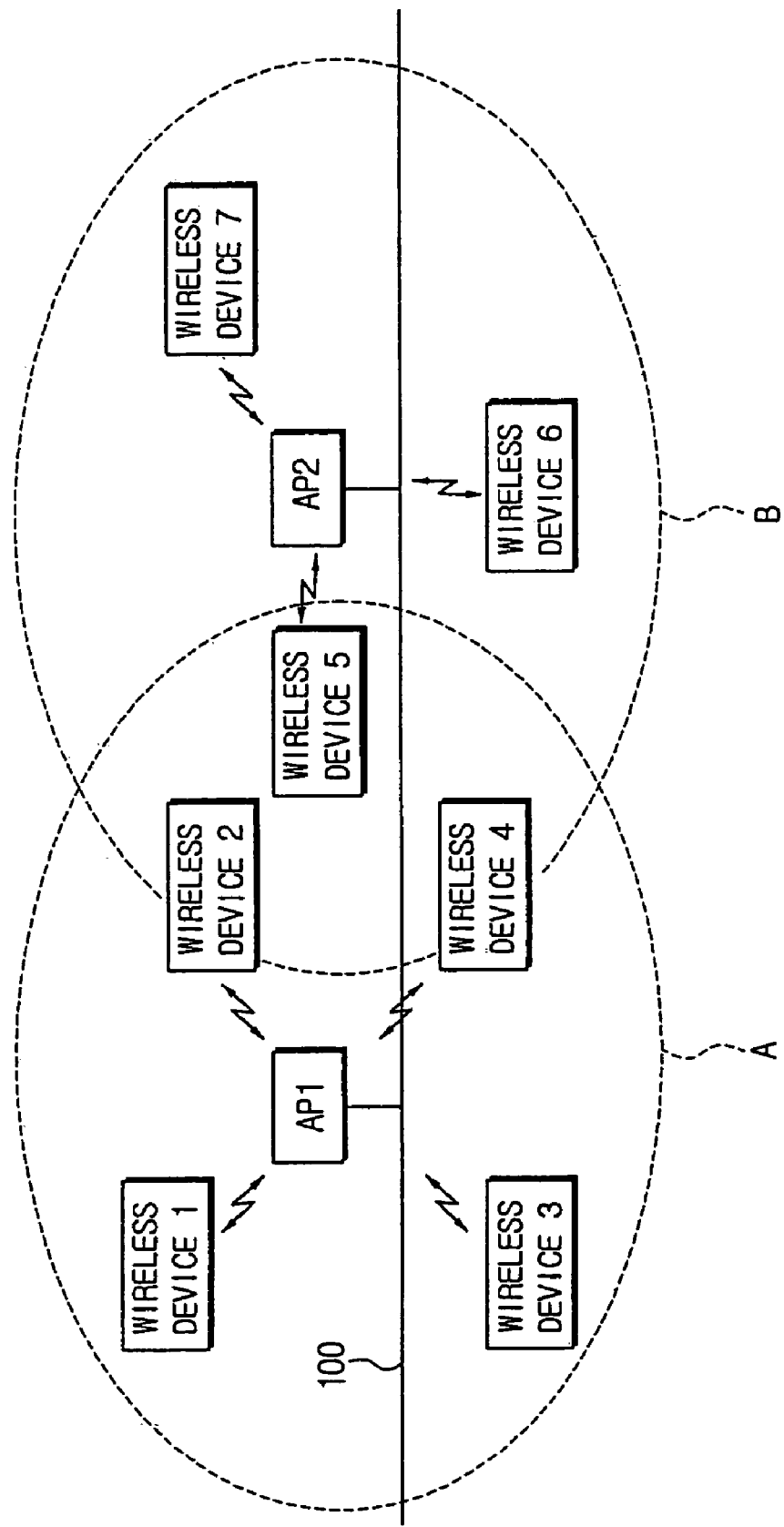
FIG. 1 is a diagram illustrating a wireless communication system in wireless infrastructure networking environments according to an embodiment of the present invention.

Reference will now be made in detail to the embodiments of the present invention, examples of which are illustrated in the accompanying drawings, wherein like reference numerals refer to the like elements throughout. The embodiments are described below to explain the present invention by referring to the figures.

FIG. 1 is a diagram illustrating a wireless communication system in wireless infrastructure networking environments according to an embodiment of the present invention.

Referring to FIG. 1, wireless devices 1, 2, 3, and 4 construct one network with an access point AP1, and wireless devices 5, 6, and 7 construct another network with an access point AP2. The AP1 and AP2 are connected through a wired LAN 100, and act as a bridge connecting wired devices connected through the wired LAN 100 and the wireless devices 1 to 7. Reference letters A and B denote a wireless communication range of the AP1 and AP2, respectively, in FIG. 1.

The wireless devices 1 to 4 connected to the AP1 have the same IDs as the BSSID and SSID assigned to AP1, and can communicate with wired devices through the AP1 only. The wireless devices 5 to 7 connected to the AP2 have the same IDs as the BSSID and SSID assigned to the AP2, and can communicate with the wired devices through the AP2 only.

Figure 2:
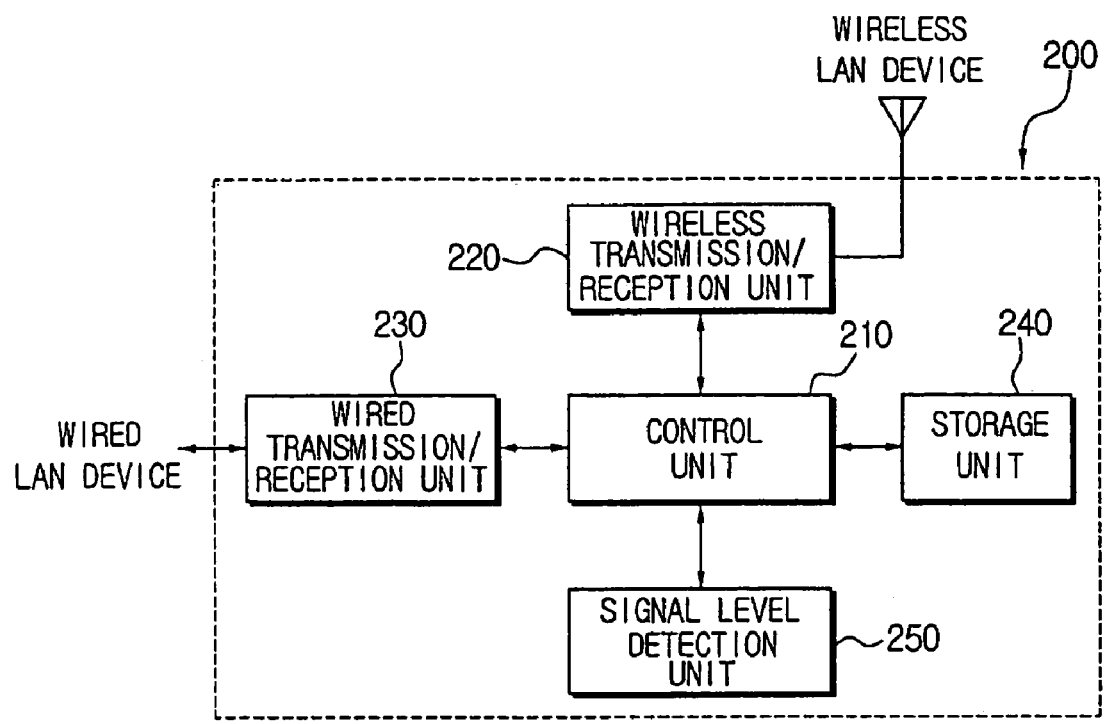
FIG. 2 is a block diagram illustrating an access point such as shown in FIG. 1.

FIG. 2 is a block diagram illustrating an access point such as shown in FIG. 1.

Referring to FIG. 2, an access point 200 has a control unit 210, a wireless transmission/reception unit 220, a wired transmission/reception unit 230, a storage unit 240, and a signal level detection unit 250.

The wireless transmission/reception unit 220 provides a communication interface between the control unit 210 and a wireless LAN device. That is, the wireless transmission/reception unit 220 receives data packets sent from a wireless LAN device through an antenna, or transmits data packets to the wireless LAN device through the antenna.

The wired transmission/reception unit 230 provides a communication interface between the control unit 210 and a wired LAN device. That is, the wired transmission/reception unit 230 controls data packet transmissions and receptions between the control unit 210 and wired LAN devices.

The storage unit 240 has a ROM to store control programs to control the overall operations of the AP 200, and a RAM to temporarily store data packets sent from the wireless transmission/reception unit 220 and the wired transmission/reception unit 230. The storage unit 240 according to this embodiment of the present invention stores registration list information on neighboring APs. Table 1 shows a registration list regarding neighboring APs stored in the storage unit 240, for example.

TABLE 1

| AP NAME | SSID | BSSID | Etc |
| --- | --- | --- | --- |
| AP1 | aaa | DDDDDDDD | ... |
| AP2 | bbb | EEEEEEEE | ... |
| AP3 | bcc | AAAAAAAA | ... |
| AP4 | ddd | FFFFFFFF | ... |

As shown in Table 1, information on neighboring APs includes neighboring AP names, AP network IDs (SSID, BSSID), and other information that is not shown, such as AP Media Access Control (MAC) addresses.

The signal level detection unit 250 detects a level of a signal received through the wireless transmission/reception unit 220 and the wired transmission/reception unit 230. A signal level value detected by the signal level detection unit 250 is applied to the control unit 210.

The control unit 210 controls the overall operations of the AP 200 according to the control programs stored in the storage unit 240. The control unit 210 determines whether beacon frames are received from neighboring APs in order for optimum communications to be enabled, and determines whether neighboring APs exist according to signal levels of the received beacon frames. At this time, the control unit 210 compares a predetermined threshold value with the signal level value received from the signal level detection unit 250 corresponding to the received beacon frames, and determines whether a different AP exists in the wireless communication range of the AP 200 according to a result of the comparison. The control unit 210 determines a different AP exists at a neighboring location if the received signal level value is more than the predetermined threshold value.

Further, the control unit 210 checks communication states of neighboring APs through communications with the neighboring APs, and, in the case that a neighboring AP does not perform communications, broadcasts an AP replacement command signal so that wireless devices associated with the neighboring AP can replace the neighboring AP.

Figure 3:
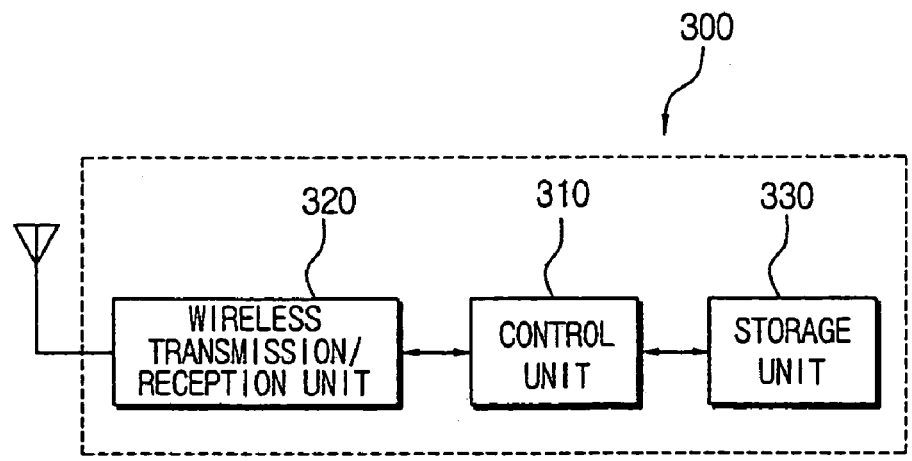
FIG. 3 is a block diagram illustrating a wireless device such as shown in FIG. 1.

FIG. 3 is a block diagram illustrating a wireless device such as shown in FIG. 1.

As shown in FIG. 3, a wireless device 300 has a control unit 310, a wireless transmission/reception unit 320, and a storage unit 330.

The wireless transmission/reception unit 320 controls a communication interface between the control unit 310 and a wireless device. The wireless transmission/reception unit 320 sends and receives data packets through an antenna.

The storage unit 330 has a ROM to store control programs to control the overall operations of the wireless device 300, and a RAM to temporarily store data packets to be sent or received through the wireless transmission/reception unit 320.

The control unit 310 controls the overall operations of the wireless device 300 according to the control programs stored in the storage unit 330. If a signal requesting an AP replacement is received from a different AP while waiting for communications due to disassociation with a current AP, the control unit 310 requests an association with the neighboring AP having sent the AP replacement request signal. If a communication channel with the neighboring AP is formed, the wireless device 300 can perform communications through the neighboring AP.

Figure 4:
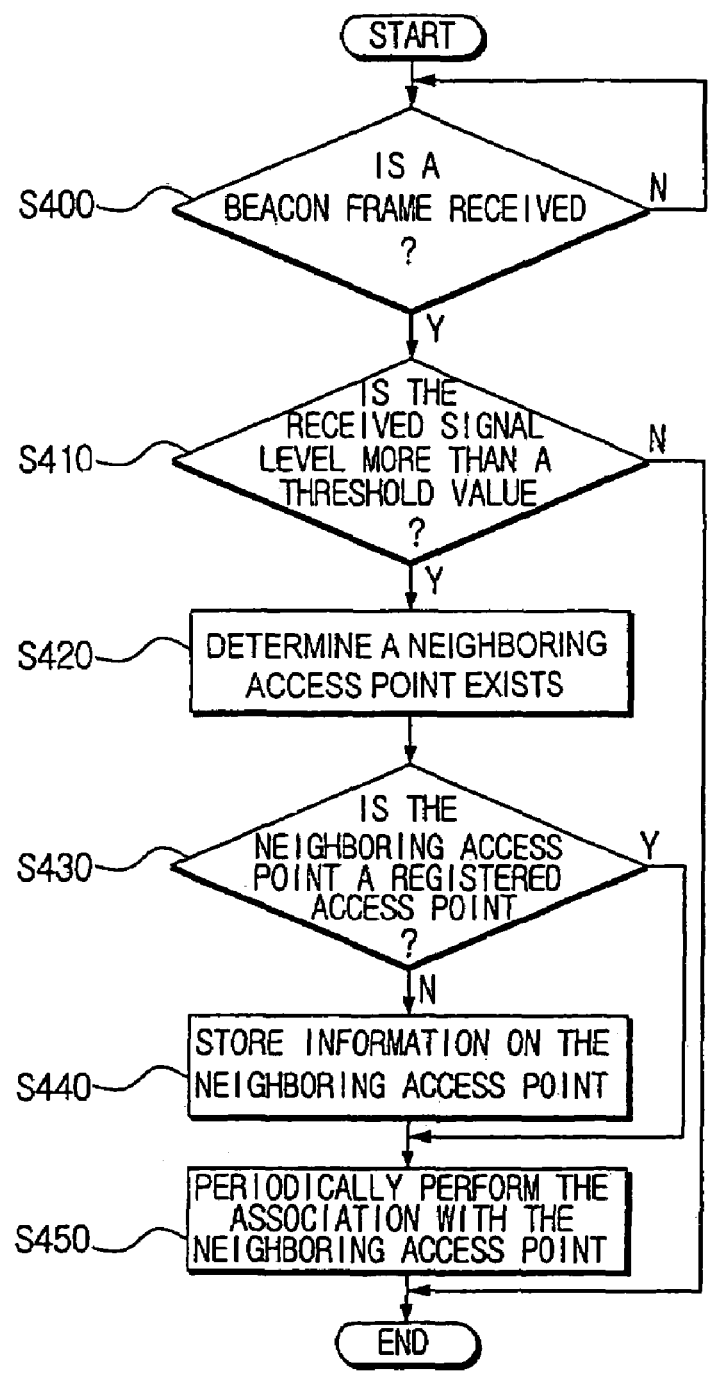
FIG. 4 to FIG. 6 are flow charts illustrating communication processes for the wireless communication system according to an embodiment of the present invention.
Figure 5:
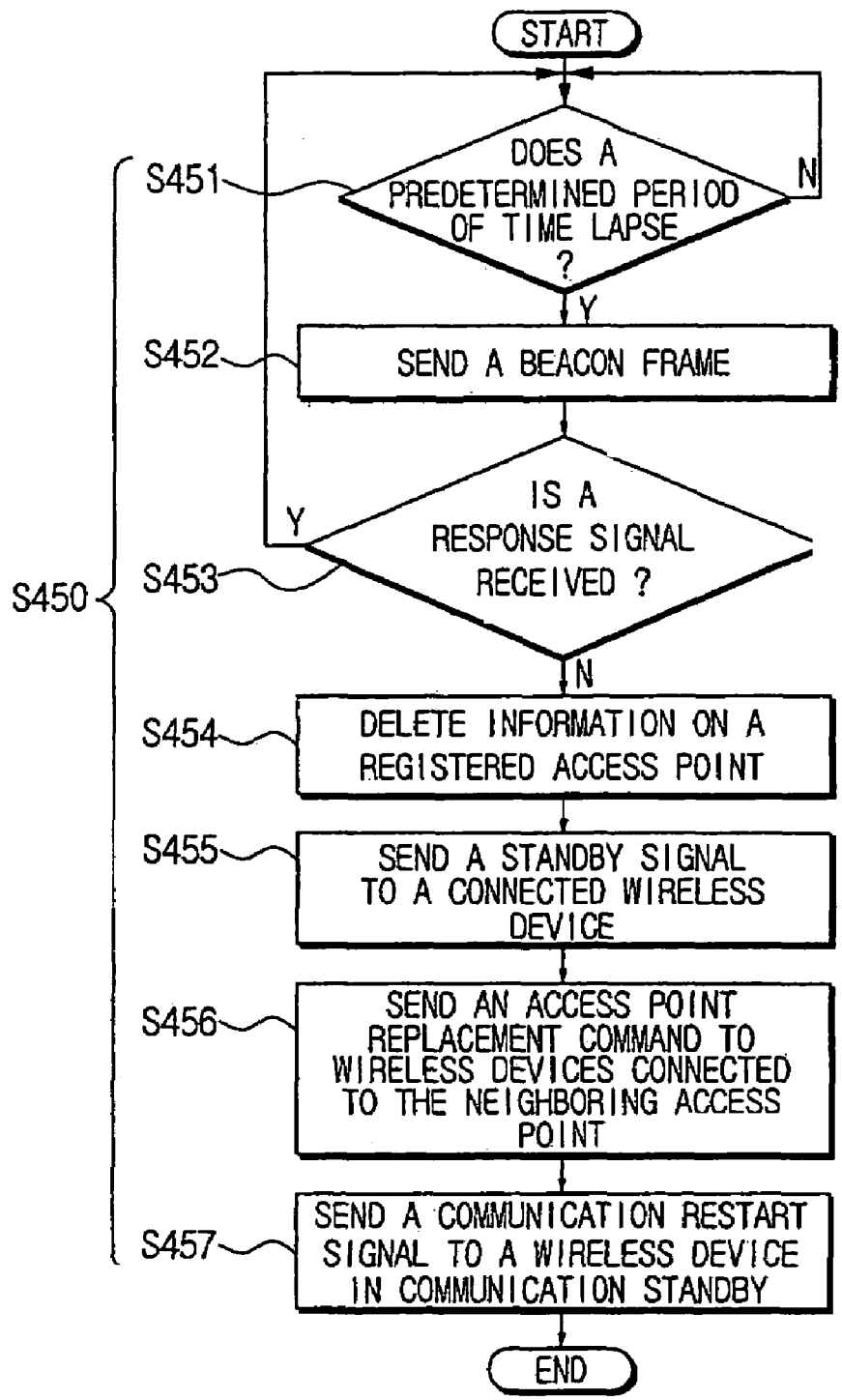
Figure 6:
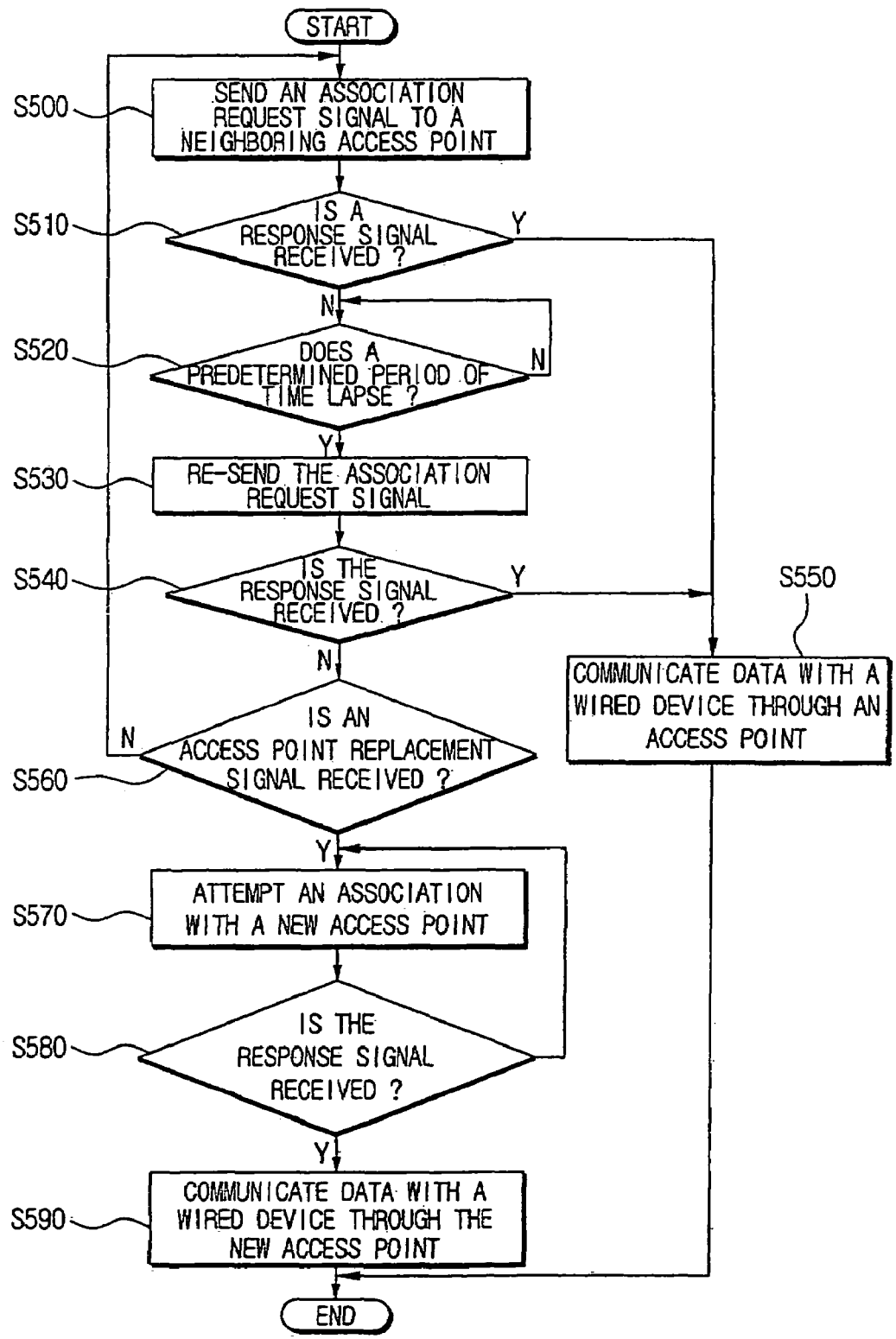

FIG. 4 to FIG. 6 are flow charts illustrating a communication method for the wireless communication system according to an embodiment of the present invention.

FIG. 4 is a flow chart illustrating an operation process for an access point. The present embodiment will be described with the AP1 shown in FIG. 1.

Referring to FIG. 4, the AP1 determines whether a beacon frame is received to check if there is a neighboring AP (S400). If a beacon frame is determined to be received, the AP1 determines whether a signal level of the beacon frame being currently received is more than a predetermined threshold value (S410). If the received signal level is determined to be more than the predetermined threshold value in operation S410, the AP1 determines that a neighboring AP exists (S420). On the contrary, if the received signal level is determined to be less than the predetermined threshold value, the AP1 determines that a neighboring AP does not exist, and ends the operations. Hereinafter, descriptions will be made with the AP2 of FIG. 1 as a neighboring AP, for example.

Next, the AP1 sends an association request signal to AP2, requiring a communication establishment. At this time, the AP2 sends to the AP1 an association response signal including BSSID and SSID information necessary for the communication establishment.

The AP1 determines whether the AP2 is a registered neighboring AP in use of the BSSID and SSID included in the association response signal received from the AP2 (S430).

If the AP2 is determined to be a non-registered neighboring AP in operation S430, the AP1 stores registration information BSSID and SSID of the AP2 onto a neighboring AP registration list (S440). Further, the AP1 periodically communicates with the AP2 (S450).

The operation S450 will be described in more detail with reference to FIG. 5. The AP1 registers the AP2 as a neighboring AP in operation S440, and the AP1 then determines whether a predetermined period of time lapses (S451). If it is determined that the predetermined period of time lapses in operation S451, the AP1 sends a beacon frame to the AP2 (S452). Further, the AP1 determines whether a response signal is received from the AP2 in correspondence to the beacon frame in order to check the communication states of the AP2 (S453). In the meantime, since the AP1 and AP2 periodically broadcast beacon frames for synchronizations with wireless devices, the AP1 checks whether a beacon frame is received from the AP2, to thereby identify the communication states of the AP2.

If it is determined that a response signal to the sent beacon frame is not received from the AP2, or a beacon frame is not received for a predetermined period of time in operation S453, the AP1 deletes the information on the AP2 from the neighboring AP registration list (S454). Further, the AP1 sends a communication standby signal to the wireless devices 1 to 4 connected thereto (S455). At this time, the wireless devices 1 to 4 connected to the AP1 wait until a communication restart signal is received from the AP1.

After operation S455, the AP1 sends an AP replacement command to the wireless devices 5 to 7 connected to the AP2 (S456). After sending the AP replacement command signal to the wireless devices 5 to 7, the AP1 sends the communication restart signal to the wireless devices 1 to 4, which are in the communication standby (S457). Further, if the AP1 receives an association request signal from any of the wireless devices 5 to 7 connected to the AP2 in correspondence to the AP replacement command signal, the AP1 establishes a new communication channel through the association with the wireless device having requested the association.

In the operations described above, the communication standby signal and the communication restart signal are sent to the wireless devices 1 to 4 from the AP1, and the AP replacement command signal is sent from the AP1 to the wireless devices 5 to 7, the signals being included in a management frame of data frames used in the wireless communication system according to this embodiment of the present invention. The management frame is the same as defined in the IEEE 802.11 standard. That is, the management frame is structured with a body field, a duration field, a destination address field, a source address field, a BSSID field, a sequence control field, an information element field, and a frame check sequence (FCS) field. State codes corresponding to the communication standby signal, communication restart signal, and AP replacement command signal can be set for use in the information element field of the management frame.

FIG. 6 is a flow chart illustrating operations of a wireless device according to this embodiment of the present invention. The present embodiment will be described with the operations of the wireless device 5 connected to the AP2 of FIG. 1, for example.

Referring to FIG. 6, the wireless device 5 sends an association request signal to the AP2 (S500), and determines whether an association response signal is received from the AP2 in correspondence to the wireless association request signal (S510). If it is determined that the association response signal is not received in operation S510, the wireless device 5 waits for a predetermined period of time (S520), and re-sends the association request signal to the AP2 (S530). If it is determined in operation S540 that the association response signal is received in response to the re-sending of operation S530, the wireless device 5 communicates data with a wired device through the AP2 (S550).

In the meantime, if the association response signal is determined to not be received from the AP2 in response to the association request signal of operation S530, the wireless device 5 determines whether an AP replacement command signal is received from a new AP such as the AP1 (S560). That is, the wireless device 5 determines whether a beacon frame is received. If the beacon frame is determined to be received, the wireless device 5 determines whether the information of BSSID and SSID included in the received signal matches the information of BSSID and SSID registered therein. If the two pieces of information on BSSID and SSID are determined to not be the same, the wireless device 5 determines a new AP exists at a neighboring location.

Accordingly, the wireless device 5 sends the association request signal to the AP1 for a connection attempt (S570). In response to the attempt, if the wireless device 5 receives the association response signal from the AP1 (S580), the wireless device 5 changes its own information of BSSID and SSID to the information of BSSID and SSID assigned to the AP1. Thereafter, the wireless device 5 communicates data with wired devices through the AP1 (S590).

In the meantime, the wireless device 5 connected to the AP2 as described above exists in the wireless communication range of the AP1, so that it can participate in the network environment of the AP1. Accordingly, the wireless devices 6 and 7, as shown in FIG. 1, cannot participate in the network environment of the AP1 because they do not exist in the wireless access point range of the AP1. However, even though not shown in the drawings, in the case that a neighboring AP exists around the wireless devices 6 and 7, the wireless devices 6 and 7 can communicate with wired devices through the neighboring AP.

As described so far, in the wireless communication system and the optimum communication method therefor according to the present invention, if an access point associating with wireless devices fails to act as a mediator due to a sudden situation, the wireless devices sharing one network environment through the access point can associate with a neighboring access point, having sent an access point replacement command and continuing communications through the new access point, to thereby enhance the communication efficiency.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A wireless communication system, comprising:
   first and second wireless devices; and
   first and second access points to synchronize the first and second wireless devices;
   wherein the first access point determines whether the second access point exists in a neighboring area, periodically checks communication states of the second access point, sends an access point replacement command to the second wireless device linked to the second access point in response to determining the second access point is communication-disabled, and forms a new communication channel with the second wireless device according to an association request signal received from the second wireless device in response to the access point replacement command.

2. A wireless communication system, comprising:
   a first wireless device; and
   first and second access points;
   wherein the first access point determines whether the second access point exists in a neighboring area, periodically checks communication states of the second access point, sends an access point replacement command to the first wireless device associated with the second access point, in response to a determination that the second access point is communication-disabled, to command the first wireless device to disassociate from the second access point, and forms a new communication channel with the first wireless device according to an association request signal received from the first wireless device in response to the access point replacement command.

3. The wireless communication system as claimed in claim 2, wherein the first access point comprises:
   a wireless transmission/reception unit to communicate with one or more wireless devices;
   a storage unit to store information regarding the second access point; and
   a control unit to perform the determining of whether the second access point exists in the neighboring area, store in the storage unit the information regarding the second access point, perform the periodically checking of the communication states of the second access point with reference to the stored information, send the access point replacement command through the wireless transmission/reception unit, and form the new communication channel with the first wireless device.

4. The wireless communication system as claimed in claim 3, wherein the information regarding the second access point comprises media access control (MAC) address information and network address information.

5. The wireless communication system as claimed in claim 4, wherein the MAC address information and network address information comprises a basic service set identifier (BSSID) and a service set identifier (SSID).

6. The wireless communication system as claimed in claim 5, wherein the first access point determines whether the second access point is a registered access point existing in the neighboring area and in use of the BSSID and SSID.

7. The wireless communication system as claimed in claim 6, wherein the BSSID and SSID of the second access point are stored on a list of registered access points existing in the neighboring area in response to the determination that the second access point is not on the list of registered access points.

8. The wireless communication system as claimed in claim 7, wherein second access point is deleted from the list of registered access points in response to the determining that the second access point is communication-disabled.

9. The wireless communication system as claimed in claim 3, wherein the second access point comprises a second wireless transmission/reception unit, a second storage unit to store information regarding the first access point, and a second control unit to determine whether the first access point exists in the neighboring area and store in the second storage unit the information regarding the first access point.

10. The wireless communication system as claimed in claim 3, wherein the control unit sets a predetermined amount of time as a corresponding periodicity for the periodic checks of the communication states of the second access point.

11. The wireless communication system as claimed in claim 3, wherein the control unit determines whether a beacon frame is received through the wireless transmission/reception unit, and then accordingly determines whether the second access point exists in the neighboring area based upon the beacon frame determination.

12. The wireless communication system as claimed in claim 11, wherein the first access point further comprises a signal level detection unit to detect a level of a signal received through the wireless transmission/reception unit, wherein the control unit determines whether the second access point exists in the neighboring area based on at least the signal level of the beacon frame being more than a predetermined threshold value.

13. A communication method of a wireless communication system having at least a first wireless device and first and second access points, the method comprising:
    determining whether the second access point exists in a neighboring area of the first access point, and storing information regarding the second access point;
    periodically checking communication states of the second access point, and sending an access point replacement command from the first access point to the first wireless device associated with the second access point, in response to determining the second access point to be in a communication-disabled state, to command the first wireless device to disassociate with the second access point; and
    forming a new communication channel with the first access point and the first wireless device according to an association request signal received by the first access point from the first wireless device in response to the access point replacement command.

14. The communication method as claimed in claim 13, wherein the information regarding the second access point comprises MAC address information and network address information.

15. The communication method as claimed in claim 14, wherein the MAC address information and network address information is stored on a neighboring access point registration list.

16. The communication method as claimed in claim 13 wherein the determining whether the second access point exists in the neighboring area of the first access point comprises determining whether a beacon frame is received through a wireless communication channel.

17. The communication method as claimed in claim 13, wherein the determining whether the second access point exists in the neighboring area of the first access point comprises determining whether either a second access point beacon frame is received by the first access point or a second access point response signal is sent by the second access point in response to a first access point beacon frame sent from the first access point.

18. The communication method as claimed in claim 13, wherein the periodically checking of the communication states of the second access point comprises deleting the stored information regarding the second access point in response to the determining of the second access point to be in the communication-disabled state.

19. The communication method as claimed in claim 13, further comprising sending a communication standby signal to a second wireless device, associated with the first access point, before sending the access point replacement command to the first wireless device.

20. The communication method as claimed in claim 19, further comprising sending a restart signal to the second wireless device after the sending of the access point replacement command.

21. The communication method as claimed in claim 13, wherein the checking of the communication states of the second access point, and the sending of the access point replacement command further comprises:
    broadcasting an association request signal from the first access point to the second access point;
    determining the communication states of the second access point according to whether an association response signal is received from the second access point; and
    sending the access point replacement command to the second wireless device in response to the second Access Point being determined to be in the communication-disenabled state.

22. A communication method of a wireless communication system having first and second wireless devices and first and second access points to synchronize the first and second wireless devices, the method comprising:
    determining whether the second access point exists in a neighboring area of the first access point, and storing information regarding the second access point;
    periodically checking communication states of the second access point, and sending an access point replacement command to the second wireless device linked to the second access point in response to determining the second access point to be in a communication-disabled state; and
    forming a new communication channel with the second wireless device according to an association request signal received from the second wireless device in response to the access point replacement command,
    wherein the forming the new communication channel with the second wireless device comprises:
    broadcasting the association request signal to the second access point;
    determining the communication states of the second access point according to whether an association response signal is received from the second access point; and
    sending the access point replacement command to the second wireless device in response to the second Access Point being determined to be in the communication-disenabled state.

23. A wireless communication system, comprising:
    a first wireless device; and
    first and second access points to communicate with one or more wireless devices;
    wherein the first access point sends an access point replacement signal to the first wireless device, in response to a determination that the second access point is unable to communicate, to command the first wireless device to disassociate with the second access point and to establish communication with the first access point.

24. An access point of a wireless communication system, wherein the access point determines whether a neighboring access point is unable to communicate and sends an access point replacement signal to a wireless device associated with the neighboring access point to command the wireless device to disassociate with the neighboring access point and to establish communication with the access point.

25. A communication method of a wireless communication system having at least one wireless device and at least one access point to communicate with the at least one wireless device, the method comprising:

determining that a first access point is unable to communicate with an associated wireless device;

sending an access point replacement signal to the associated wireless device from a second access point to command the wireless device to disassociate with the first access point; and establishing communication between the associated wireless device and the second access point in response to the associated wireless device acknowledging the access point replacement signal.

26. A method of controlling an access point in a wireless communication system, the method comprising:

establishing communication of a local access point with a wireless device that is associated with a neighboring access point, in response to a detection of the neighboring access point being unable to communicate with the wireless device, by sending an access point replacement signal to the wireless device to command the wireless device to disassociate with the neighboring access point.

27. A wireless device of a wireless communication system having at least one wireless device associated with at least one access point, to determines whether an access point replacement signal is sent from a neighboring access point, in response to the at least one access point not being able to communicate, to command the wireless device to disassociate with the at least one access point, and establishing communication with the neighboring access point in response to determining the access point replacement signal has been sent, with the access point replacement signal being sent by the neighboring access point based upon a detection that the at least one access point is unable to communicate.

\* \* \* \* \*